United States Patent [19]

Cubalchini

[11] Patent Number: 4,475,577

[45] Date of Patent: Oct. 9, 1984

[54] METHOD AND APPARATUS FOR PRESSURIZING FLUID SHOCK ABSORBERS OR SPRINGS

[75] Inventor: Joseph Cubalchini, St. Charles, Ill.

[73] Assignee: Maremont Corporation, Carol Stream, Ill.

[21] Appl. No.: 567,134

[22] Filed: Dec. 30, 1983

Related U.S. Application Data

[63] Continuation-in-part of Ser. No. 389,598, Jun. 18, 1982, abandoned.

[51] Int. Cl.³ .............................................. F16F 9/00
[52] U.S. Cl. ............................... 141/349; 188/322.21; 267/64.28; 277/3
[58] Field of Search ............... 141/3, 4, 20, 98, 311 R, 141/329, 349, 350, 352, 353, 354, 355, 392; 188/322.16, 322.17, 322.18, 322.21; 267/64.28; 277/3

[56] References Cited

U.S. PATENT DOCUMENTS

Re. 28,329  2/1975  Nicholls ........................ 188/322.16
4,364,457  12/1982  Wössner et al. ............... 188/322.17

Primary Examiner—Stephen Marcus
Assistant Examiner—Mark J. Thronson
Attorney, Agent, or Firm—Allegretti, Newitt, Witcoff & McAndrews, Ltd.

[57] ABSTRACT

A gas charging head which is fitted atop the piston rod of an hydraulic damper. A force is applied to the charging head driving the piston rod back within the damper cylinder. As the piston rod moves in the cylinder, a seal penetrating device associated with the head displaces the piston rod seal. An annular path is formed between the piston rod and the inner surface of the penetrating device for communicating with a pressurized cavity in the charging head supplying gas under pressure to the internal volume of the damper.

4 Claims, 1 Drawing Figure

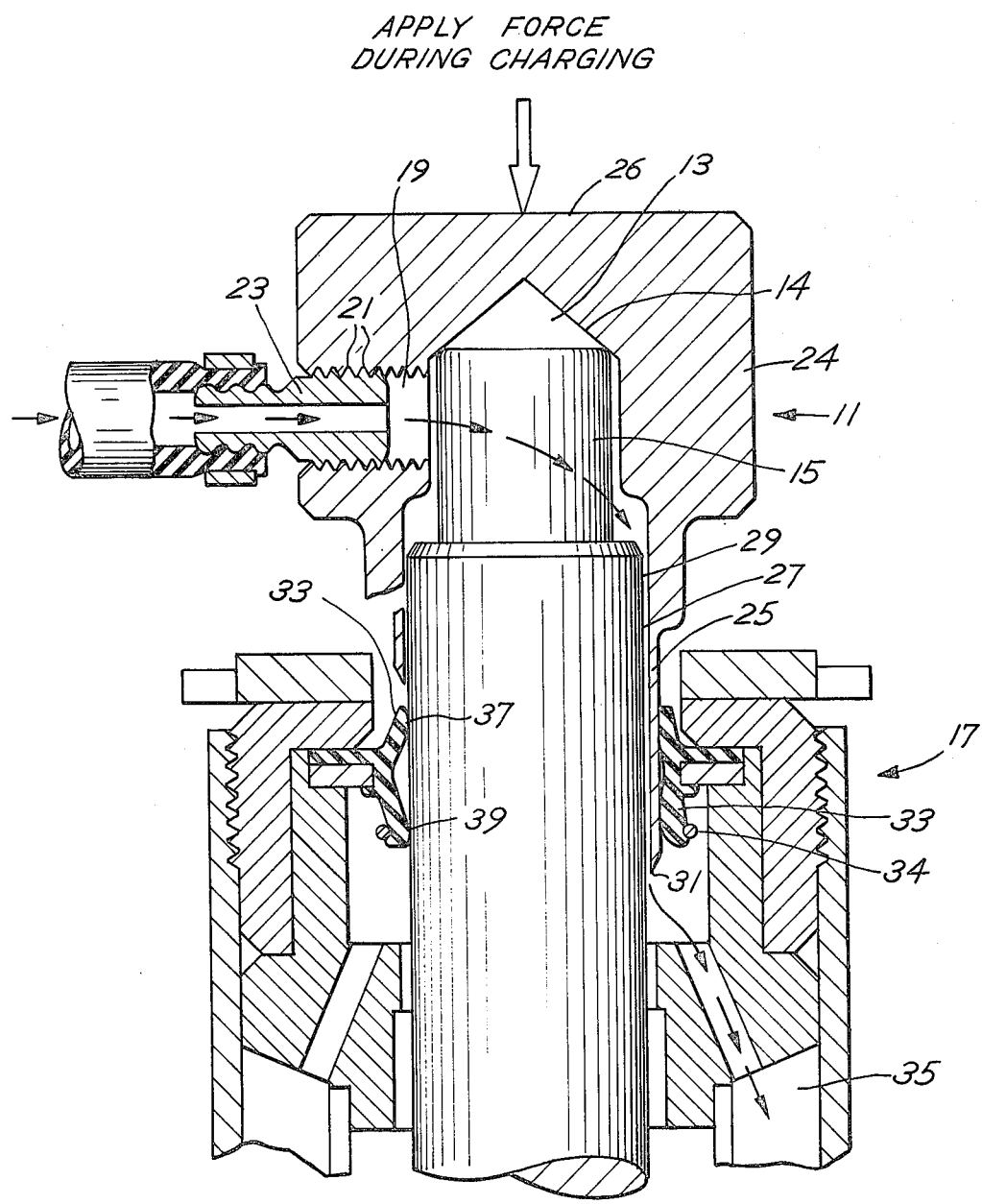

METHOD AND APPARATUS FOR PRESSURIZING FLUID SHOCK ABSORBERS OR SPRINGS

This application is a continuation-in-part of application Ser. No. 389,598 filed June 18, 1982, now abandoned.

BACKGROUND OF THE INVENTION

The invention relates to a gas charging head for pneumatically pressurizing a vehicle suspension fluid spring or damper such as an air spring, a shock absorber or a McPherson strut, and more particularly relates to a gas charging head which mechanically deflects a seal for introducing gas under pressure to the damping chambers of a suspension damper.

Heretofore, shock absorbers and struts have been pressurized by drilling a hole in the outer wall of the shock cylinder. After pressurizing the cylinder through the drilled passage, the passage is sealed by pressing a plug or ball into the drilled passage. Alternatively, the passage may be sealed by welding after the passage has been closed by the plug.

This method requires several operations such as drilling and welding which, at best, impose additional expense and the chance that metal chips or weld contaminants may be introduced into the damper assembly.

Another method of pressurizing vehicle dampers utilizes excessively high gas pressure over the piston rod seal to displace the seal and force the gas past the seal and into the chamber. Such a method makes control of the final pressure level within the damper rather difficult. The final internal pressure depends on many variables such as, the preload on the seal by the retention spring of the damper, the interface between the sealing face of the seal and the piston rod, as well as other variables.

It is therefore an object of the present invention to provide an improved gas charging apparatus for use with vehicle dampers, struts or fluid springs.

It is yet another object of the present invention to provide a charging head for use with vehicle dampers which easily controls the final internal gas pressure level within the damper body.

SUMMARY OF THE INVENTION

These and other objects of the invention are accomplished in a gas charging head which is fitted atop the piston rod of a damper or spring. A force is applied to the charging head driving the piston rod back within the damper/spring cylinder. As the piston rod moves into the cylinder, a seal penetrating device associated with the head displaces the piston rod seal. An annular path is formed between the piston rod and the inner surface of the penetrating device for communicating with a pressurized cavity in the charging head supplying gas under pressure to the internal volume of the damper/spring.

BRIEF DESCRIPTION OF THE DRAWINGS

The single FIGURE illustrates in general cross section a preferred embodiment of a gas charging fixture of the present invention, in association with a vehicle damper.

DESCRIPTION OF THE PREFERRED EMBODIMENT

Referring to the single FIGURE, a gas charging head 11 includes a cavity 13 for receiving the piston rod 15 of a conventional MacPherson strut, or other vehicle suspension damper, generally referred to by reference numeral 17. As will suggest itself, strut 17 may be an air or hydraulic spring; however, the preferred embodiment will be described herein in relation to a strut 17. Strut 17 includes a piston rod seal 33 having a pair of lip portions 37, 39 which bear against piston rod 15 to seal a gas under pressure within the strut while permitting movement of the piston rod relative to the seal. The seal is formed from a flexible material, as understood.

Charging head 11 is formed with a passageway 19 for communicating with cavity 13. The walls of passageway 19 are ribbed or threaded as indicated by reference numeral 21 so as to receive a gas pressurizing nozzle 23. Nozzle 23 supplies gas under pressure from a pressure source (not shown) into cavity 13 via passageway 19.

Cavity 13 is generally cylindrical in shape, as shown, being formed with a funnel shaped top portion 14 against which the top of piston rod 15 abuts. The funnel shaped top portion of the cavity generally aligns the vertical axis of the piston rod with the vertical axis of charging head 11.

Charging head 11 includes a generally cylindrical top portion 24, within which cavity 13 is formed. Top portion 24 carries a top flat surface 26 against which a force is applied for driving the piston rod and charging head relative to the body of the strut.

A seal penetrating member 25 is formed integral to top portion 24 and depends downwardly therefrom as illustrated in the single FIGURE. Penetrating member 25 is shown cut away on the left side of the piston rod to illustrate the penetrating member relative to seal 33 when the piston rod is extended outward from the strut. On the right side of the piston rod, the penetrating member is shown relative to seal 33 when the piston rod is driven within the strut.

Seal penetrating member 25 is cylindrically shaped and includes an inner cylindrical cavity 27 which communicates directly with cavity 13 as shown. The radial dimension of cavity 27 is slightly larger than piston rod 15 in order to receive the rod and form an annular passageway 29 between the rod and the inside surface of penetrating member 25.

As understood, the particular shape of piston rod 15 dictates the relative size of cavities 13, 27. The piston rod shown in the single FIGURE includes two coaxial portions of different diameters. As will suggest itself, cavities 13, 27 may have the same diameter.

Seal penetrating member 25 includes a tip portion 31 formed at its lower end by inwardly tapering the lower portion of the outer cylindrical surface of the penetrating member 25. As the piston rod is retracted within strut 17, tip portion 31 is moved against piston rod seal 33 deflecting the lip portions 37 and 39 of seal 33 radially away from piston rod 15 permitting the penetrating member to pass between the lip portions and the piston rod. Lip portions 37 and 39 bear against the external cylindrical surface of penetrating member 25 effecting a seal at the contact locations. As understood, a conventional spring member 34 may be included in the strut structure to bias seal 33 toward piston rod 15.

Pressurized gas is fed to cavity 13 via passageway 19 and nozzle 23. From cavity 13 the pressurized gas moves into cavity 27, down annular passageway 29 and into the damper fluid reservoir 35. When a desired internal pressure is established within the reservoir, the piston rod and penetrator head assembly is extended outwardly from the strut, causing piston rod seal lip 39 to return to the piston rod surface sealing the gas within the strut. Further withdrawal of the penetrating member 25 permits seal lip 37 to reestablish sealing contact with the piston rod surface to exclude contaminants.

It is to be understood, of course, that the foregoing describes a preferred embodiment of the present invention and that modifications may be made therein without departing from the spirit or scope of the present invention as set forth in the appended claims.

What is claimed:

1. Apparatus for introducing a gas under pressure to a pressurized, piston receiving, working chamber, a cylindrical piston rod extends out from the working chamber and a piston rod seal prevents pressurizing gas within the chamber from leaving the rod end portion of the working chamber as the piston rod moves operably with respect to said seal and said working chamber, the apparatus comprising:

head means including a first chamber for receiving the top of the piston rod, said head means for receiving a force to apply a corresponding force to the piston rod moving the piston rod into the chamber;

gas inlet means including an opening formed in said head means and communicating with said first chamber, said gas inlet means for receiving gas under pressure into said first chamber;

seal penetrating means depending from said head means and including a second chamber of cylindrical shape of a diameter slightly larger than the diameter of the piston rod for receiving the piston rod and forming an annular gas path between the piston rod and the inner surface of said penetrating means, said annular gas path communicating with said first chamber;

a tip structure formed at the end of said penetrating means for contacting the piston rod seal as the seal penetrating means is moved relative to the piston rod seal, said tip structure forcing the seal outwardly from the piston rod permitting movement of the penetrating means between the seal and the piston rod, the seal slidably sealingly engaging the external surface of said penetrating means.

2. Apparatus acccording to claim 1 wherein said first chamber includes a funnel shaped top portion for abutting the top of the piston rod to align the second chamber with the piston rod.

3. Apparatus according to claim 1 wherein said tip structure includes a tapered surface leading from said inner surface of said penetrating means.

4. Apparatus according to claim 1 wherein said head means includes a flat, top, horizontal surface lying perpendicular to the axis of the piston rod when said second chamber receives the piston rod, said horizontal surface for receiving the first named force.

* * * * *